(12) United States Patent
Walid et al.

(10) Patent No.: US 8,797,852 B2
(45) Date of Patent: Aug. 5, 2014

(54) DYNAMICAL BANDWIDTH ADJUSTMENT OF A LINK IN A DATA NETWORK

(75) Inventors: Anwar I. Walid, Watchung, NJ (US); Lingwen Gan, Pasadena, CA (US); Steven Low, Pasadena, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 105 days.

(21) Appl. No.: 13/493,561

(22) Filed: Jun. 11, 2012

(65) Prior Publication Data

US 2013/0329747 A1 Dec. 12, 2013

(51) Int. Cl.
*H03H 7/30* (2006.01)

(52) U.S. Cl.
USPC .......................................................... 370/229

(58) Field of Classification Search
CPC ......... H04L 47/10; H04L 49/25; H04L 49/90; H04L 45/00; H04L 47/22; H04L 47/2441
USPC ........................... 370/310, 315, 316, 317, 318
See application file for complete search history.

(56) References Cited

U.S. PATENT DOCUMENTS

| | | | | |
|---|---|---|---|---|
| 6,222,822 | B1* | 4/2001 | Gerardin et al. | 370/230 |
| 7,197,571 | B2* | 3/2007 | Sarkar et al. | 709/237 |
| 7,843,843 | B1* | 11/2010 | Papp et al. | 370/252 |
| 8,553,538 | B2* | 10/2013 | Nishimura | 370/229 |
| 2006/0215551 | A1* | 9/2006 | Narvaez et al. | 370/229 |
| 2008/0084830 | A1* | 4/2008 | Hsieh et al. | 370/252 |
| 2011/0176554 | A1* | 7/2011 | Yamada et al. | 370/412 |
| 2012/0063377 | A1* | 3/2012 | Osterling et al. | 370/311 |
| 2013/0070635 | A1* | 3/2013 | Suo et al. | 370/252 |

* cited by examiner

*Primary Examiner* — Fan Ng
(74) *Attorney, Agent, or Firm* — Hitt Gaines, PC

(57) ABSTRACT

An apparatus includes a first node configured to receive the data packets from a plurality of source nodes of the data network and to selectively route some of the received data packets to a link via a port of the first node. The apparatus also includes a link-input buffer that is located in the first node and is configured to store the some of the received data packets for transmission to the link via the port. The first node is configured to power off hardware for transmitting received data packets to the link in response to a fill level of the link-input buffer being below a threshold.

12 Claims, 5 Drawing Sheets

FIG. 4

```
                                                      ┌─ 22
┌─────────────────────────────────────────────┐
│  WHILE OPERATING A ROUTING NODE, REDUCING AN │
│  AVAILABLE BANDWIDTH OF A LINK CONNECTED TO  │
│  THE NODE IN RESPONSE TO THE CORRESPONDING LINK- │
│   INPUT BUFFER BEING FILLED BELOW A THRESHOLD │
└─────────────────────────────────────────────┘

┌─ 24
┌─────────────────────────────────────────────┐
│  WHILE OPERATING THE NODE, DROPPING ONE OR MORE DATA │
│   PACKETS FROM THE LINK-INPUT BUFFER IN RESPONSE TO  │
│   THE CORRESPONDING LINK-INPUT BUFFER BEING FILLED TO │
│   MORE THAN A SECOND THRESHOLD, WHICH IS LOWER THAN  │
│        THE AVAILABLE BANDWIDTH OF THE LINK           │
└─────────────────────────────────────────────┘
```

20

DYNAMICAL BANDWIDTH ADJUSTMENT OF A LINK IN A DATA NETWORK

BACKGROUND

1. Technical Field

The inventions relate to apparatus and methods for operating one or more elements of a data network.

2. Discussion of the Related Art

This section introduces aspects that may be helpful to facilitating a better understanding of the inventions. Accordingly, the statements of this section are to be read in this light and are not to be understood as admissions about what is prior art or what is not prior art.

Energy efficiency is a design criterion in the communication industry. In particular, designing for energy efficiency can affect hardware, software configuration, and service deployment. Past advances in semiconductor technology helped to decrease the power per transmitted byte in data networks, but the effect of such advances on power efficiency is starting to plateau. Nevertheless, the demand for greater bandwidth may be actually increasing total energy consumption levels. Such increases in total energy consumption levels may significantly increase operating costs of data networks.

Some efforts to reduce energy consumption of networks have employed the turning off or slowing down hardware devices during periods of low traffic load. Indeed, many data networks have links with large available bandwidths during low utilization levels periods. Such situations may provide opportunities to turn off excess bandwidth in manners that significantly reduce energy consumption, e.g., during low utilization periods such as nights.

Herein, the bandwidth of a link relates the amount of data packets that the link is capable of transmitting in one direction in a preselected time interval.

BRIEF DESCRIPTION OF THE FIGURES

FIG. 4 is a flow chart schematically illustrating a method for locally controlling a link of a data network, e.g., in one of the internal or routing nodes of FIG. 1;

In the Figures and text like reference numbers refer to functionally and/or structurally similar elements.

Figure 1:
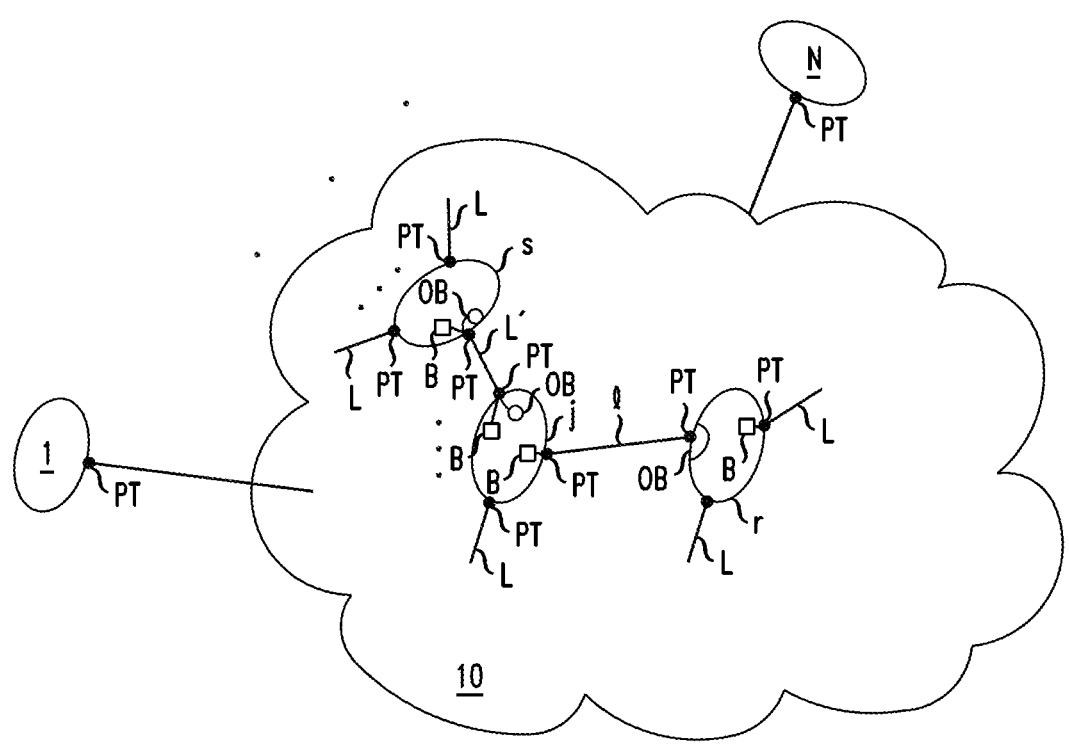
FIG. 1 is a diagram that schematically illustrates a portion of an exemplary data network.

In the Figures, the relative dimensions of some features may be exaggerated to more clearly illustrate apparatus therein.

Herein, various embodiments are described more fully by the Figures and the Detailed Description of Illustrative Embodiments. Nevertheless, the inventions may be embodied in various forms and are not limited to the specific embodiments described in the Figures and the Detailed Description of the Illustrative Embodiments.

DESCRIPTION OF THE ILLUSTRATIVE EMBODIMENTS

Embodiments of an apparatus include a first node configured to receive the data packets from a plurality of source nodes of the data network and to selectively route some of the received data packets to a link via a port of the first node. The apparatus also includes a link-input buffer that is located in the first node and is configured to store the some of the received data packets for transmission to the link via the port. The first node is configured to power off hardware for transmitting received data packets to the link in response to a fill level of the link-input buffer being below a threshold.

In some specific embodiments of the above apparatus, the first node may be configured to drop one or more data packets from the link-input buffer in response to a fill level of the link-input buffer being above a second threshold. The second threshold is less than an available bandwidth of the link. The first node may also be configured to drop one or more data packets from the link-input buffer with a probability that is monotonic non-decreasing with the fill level of the link-input buffer.

In any of the above embodiments of apparatus, the first node may be configured to support transport layer operations according to Transmission Control Protocol and may be configured to operate the link-input buffer according to a RED protocol or to flow control the link based on queuing delay feedback.

In any of the above embodiments of apparatus, the apparatus may further include the link, and the link may be a bundle of parallel physical links such that each physical link has an input end-connected to a port of the first node.

In any of the above embodiments of apparatus, the apparatus may further include a second node having a port connected to the link and a second link-input buffer. Such a second node is configured to selectively route data packets received from the link to a plurality of destination nodes of the data network and to selectively route some of the data packets received from the link to another link connected to a port of the second node. Such a second link-input buffer is located in the second node and is configured to store some data packets received by the second node for transmission to the second link. Such a second node is configured to power off hardware for transmitting data packets to the second link in response to a fill level of the second link-input buffer being below a threshold.

In any of the above embodiments of apparatus, the first node may be configured to selectively transmit some of the data packets received therein to a second link connected to another port of the first node. In such embodiments, a second link-input buffer is located in the first node and is configured to store the some data packets received by the first node for transmission to the second link. In such embodiments, the first node is configured to power off hardware for transmitting data packets to the second link in response to a fill level of the second link-input buffer being below a threshold.

An embodiment of a method includes reducing an available bandwidth of a link of a data network in response to determining that a link-input buffer of the link is filled below a threshold.

In some embodiments of the method, the reducing may include powering off hardware for transmitting data from a routing node of the data network to the link. The routing node includes the link-input buffer therein. In some such embodiments, the method may further include operating a portion of the data network including the routing node according to a TCP protocol and an RED protocol.

In any of the above embodiments of a method, the reducing may include powering off one or more physical links of a link bundle forming the link of a data network.

In any of the above embodiments of a method, the method may further include dropping one or more data packets from the link-input buffer in response to determining that the link-input buffer is filled to more than a second threshold. The second threshold is less than an available bandwidth of the link.

Embodiments of a second apparatus include a plurality of routing nodes of a data network being configured to receive data packets from source nodes of the data network and to selectively route some of the received data packets to other nodes of the data network via links of the data network. Each one of the routing nodes has a link-input buffer therein and is configured to store data packets in the link-input buffer for transmission to a corresponding one of the links connected to a port of the one of the routing nodes. Some of the routing nodes are configured to power off hardware for transmitting data packets to the links connected to ports thereof in response to the fill levels of the link-input buffers in the some of the routing nodes being below a threshold.

In some embodiments of the second apparatus, the routing nodes may be configured to drop data packets from the link-input buffer therein in response to the fill level of the link-input buffer therein being above a second threshold. The second threshold is below an available bandwidth of the corresponding one of the links. In some such embodiments, each of the routing nodes may be configured to drop one or more data packets from the link-input buffer therein with probability that is monotonic non-decreasing with the fill level of the link-input buffer therein.

In any of the above embodiments of the second apparatus, the routing nodes may be configured to support transport layer operations according to Transmission Control Protocol and may be configured either to operate the link-input buffers according to a RED protocol or to flow control the links based on queuing delay feedback.

In any of the above embodiments of the second apparatus, some of the links may be bundles of parallel physical links. In such embodiments, some of the routing nodes are configured to power off hardware for transmitting data packets to the some of the links by turning off some of the physical links in the bundles.

FIG. 1 illustrates an example of a data network 10. The data network includes N edge nodes 1, . . . i, . . . N; a plurality of internal nodes j, r, s, . . . ; and links L. Each edge node 1-N is able to transmit and/or receive data packets to others of the edge nodes 1-N via the data network 10. Thus, the edge nodes are source and/or destination nodes for data packets. Each internal node j, r, s, . . . is capable of selectively routing data packets received from one link L directly end-connected to one of the same internal node's ports (PT), to another link L directly end-connected to another of the same internal node's ports PT. Thus, each internal node is a routing node, which selectively routes data packets received from the edge nodes 1-N, e.g., based on destination addresses. Each edge and internal node 1-N, j, r, s, . . . has ports PT. The ports PT are directly connected to the ends of links L of the data network such that each link L connects a corresponding pair of said ports PT.

In various embodiments, the data network 10 may have different numbers N and/or forms of edge nodes 1-N, different numbers and/or forms of internal nodes j, r, s, . . . , and/or different network topologies, as formed by the nodes 1-N, j, r, s, . . . and the links L.

FIG. 1 shows an exemplary pair of the internal nodes j, r and a link l whose input connects directly to one port PT of the internal node j and whose output directly connects to one port PT of the internal node r. The link l is unidirectional. The internal node j has a link-input buffer (B), which stores data packet[s] available to transmit via the link l, e.g., to transmit during the next transmit period. Herein, a link-input buffer for a link is the buffer that stores the set of data packets to be transmitted to the link during the next period for transmitting data packets to the link, i.e., each data packet is stored in such a buffer prior to transmission to the corresponding link. Prior to transmission to the link l, a data packet is stored in the link-input buffer B of the internal node j. Similarly, the internal node r typically has an output link buffer (OB), which stores the data packet[s] received from the link l. After transmission over the link l, a data packet is stored in the output link buffer of the internal node r. Herein, the link-input buffer typically stores the data packet(s) that may be transmitted to the link l in the present transmit period, and the output link buffer stores the data packet(s) that may be received from the link l in the present receive period.

The internal node j, whose port PT connects to the input of the link l, both locally controls and locally monitors and controls the link l. The link l has an available bandwidth that is dynamically adjustable by the controlling internal node j. The link l may be a single physical link with an adjustable data rate. Alternately, the link l may be a link bundle having M separate, parallel, physical links. In particular, one or more of the separate, parallel, physical links may be dynamically turned off, e.g., to eliminate excess available bandwidth and conserve energy, and turned on, e.g., increase available bandwidth and support more traffic. Some types of link bundling have been standardized in IEEE 802.1AX [11].

Whereas the link l has been described as a unidirectional link, a person of ordinary skill in the relevant arts would readily understand how to modify the various embodiments to include links that are bi-directional, i.e., based on the teachings of this application. For example, the exemplary bi-direction link L' has a link-input buffer (B) and a link-output buffer (OB) on each side thereof so that one internal node j, s directly connected to each end of the link L' locally controls and monitors traffic for the link in one direction.

With respect to the monitoring, the internal node j, dynamically measures the number $b_l(t)$ of data packets stored in the link-input buffer B of the link l at time t. The number of data packets in the link-input buffer typically varies with the time t. For example, the internal node j may drop data packets from the link-input buffer for the link l at a rate depending on the number $b_l(t)$ of data packets currently stored in the link-input buffer. Such a drop rate may depend on a measured use of the link-input buffer or an average of such a measured use of storage therein for data packets.

With respect to control, the internal node j dynamically controls the available bandwidth $c_l(t)$ on the link l at time t. The control of the link l involves controlling the size of the corresponding link-input buffer B. At time t, the internal node j sets the size of the link-input buffer B to be $c_l(t)$, i.e., for use to store data packets, so that the available bandwidth on the link l is $c_l(t)$. The internal node j may have additional buffer space for a data overhead used to transmit data packets to the corresponding link l, but any such additional storage space is not referred to as part of the link-input buffer B herein, e.g., even if such storage of data overhead is done in the link-input buffer B.

With respect to control, the internal node j is configured to update the available bandwidth $c_l(t)$ on the link l based on measured value(s) of the number 140 of data packets stored in the link-input buffer B. Thus, at the internal node j, performs dynamical bandwidth adjustment to the link l based on local measurement(s) of the currently used storage of data packets in link-input buffer B for the link l or on local measurement(s) of characteristic(s) indicative thereof.

Various embodiments of the internal node j may use different methods to locally monitor and control the available bandwidth of the link l controlled by the internal node j. Some such methods use active queue management (AQM) based on a random early drop (RED) protocol and/or a Transport Control Protocol (TCP). Since TCP is a transport layer protocol, dynamically adjusting properties of a link can interact with end-to-end efficiency of routing based on TCP, e.g., reducing end-to-end throughput(s) and/or producing operating instabilities if not performed in concert with the AQM used with the TCP. For that reason, various embodiments couple dynamical link bandwidth adjustment (DLBA) with the AQM, e.g., to achieve improved energy efficiency. The embodiments use information on used storage in the link-input buffer B, e.g., information used by RED for the DLBA, to adjust the available bandwidth of the corresponding link. In some such embodiments, the inventors believe that the methods can dynamically evolve the data network 10 to quasi-stable operating configurations with lower total energy utilization. Such evolution may be achievable even when the evolution of the links is performed locally in a distributed manner.

Figure 2:
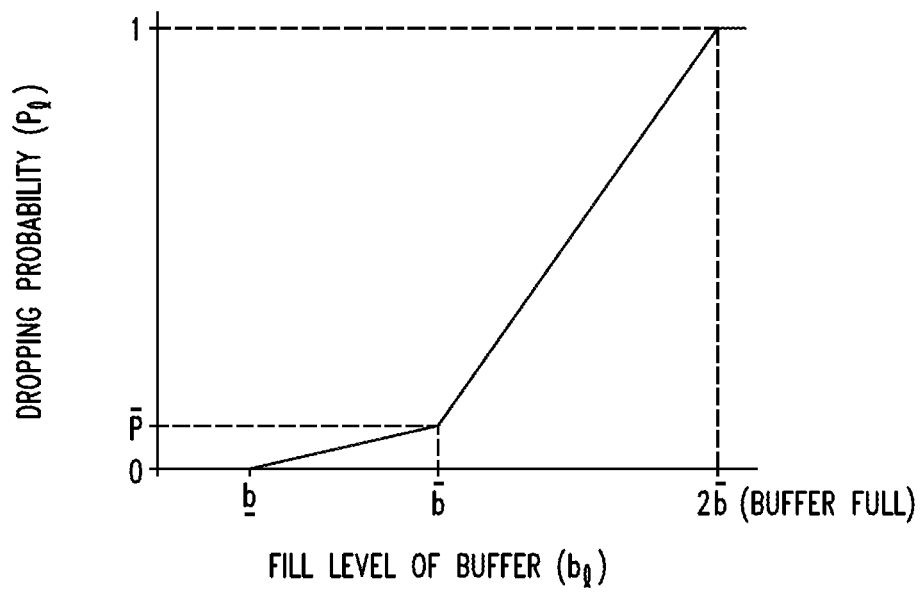
FIG. 2 is a graph illustrating the relation between the probability $p_l$ to drop a data packet from a link-input buffer of a link l and the fill level $b_l$ of the link-input buffer according to a random early discard (RED) protocol, e.g., for use in some internal or routing nodes of FIG. 1.

FIG. 2 schematically illustrates the RED process in a link-input buffer, e.g., in the internal node j of FIG. 1. The RED protocol provides a relationship between the probability $p_l(t)$ of dropping a data packet from the link-input buffer B of the link l and the fullness $b_l(t)$ of the link-input buffer B. The relationship is local so that the internal node in which the link-input buffer is located is able the implement the RED protocol locally, e.g., without information from other internal nodes. The analytical form of the RED protocol is given by:

$$p_l(t) = \begin{cases} 0 & \text{if } b_l(t) \le \underline{b}_l, \\ \rho_l(b_l(t) - \underline{b}_l) & \text{if } \underline{b}_l < b_l(t) \le \overline{b}_l, \\ \eta_l b_l(t) - (1 - 2\overline{p}_l) & \text{if } \overline{b}_l < b_l(t) \le 2\overline{b}_l, \\ 1 & \text{if } b_l(t) > 2\overline{b}_l. \end{cases}$$

where $$\rho_l = \frac{\overline{p}_l}{\overline{b}_l - \underline{b}_l} \text{ and } \eta_l = \frac{1 - \overline{p}_l}{\overline{b}_l}.$$

Here, $\underline{b}_l$, $\overline{b}_l$, $2\overline{b}_l$ and $\overline{p}_l$ define various behavioral regions of the RED protocol as shown in FIG. 2. In the region where $b_l(t) < \underline{b}_l$, data packets are dropped from the link-input buffer B with a probability of 0. In the region where $b_l(t) > \overline{b}_l$, data packet(s) are dropped from the link-input buffer B with a probability of 1. Between, these two regions, RED drops data packets from the link-input buffer B with a probability that varies with the fill level of the from the link-input buffer B.

The source nodes of the data network 10 often control their own data packet transmission rates, e.g., according to a protocol such as TCP. For a source node i, such control may be based on an end-to-end data packet dropping probability $q_i$ for the destination of the data packets. The end-to-end data packet dropping probability $q_i$ (e.g., often referred to as a congestion) is given by:

$$q_i = \sum_{\text{links } k \in L(i)} p_k$$

Here, L(i) is the set of links on an end-to-end path between the source node i and the selected destination node of the data network 10.

The source node i may exploit receipts of data packets by a destination node or an absence of acknowledgement messages for such receipts of data packets by the destination node to estimate the end-to-end data packet dropping probability $q_i$ for that destination node. Here, a source node i has a data packet transmission rate $x_i$, which is controlled by the source node i. The transmission rate may be, e.g., a transmission window of the source node i or the transmission window of the source node i for the destination or said transmission window divided by a delay for the round trip return (RTT), e.g., of an acknowledgement, in the data network 10. Herein, a transmission window is the number of unacknowledged bits or data packets that the corresponding source node will transmit for a given destination node.

Figure 3:
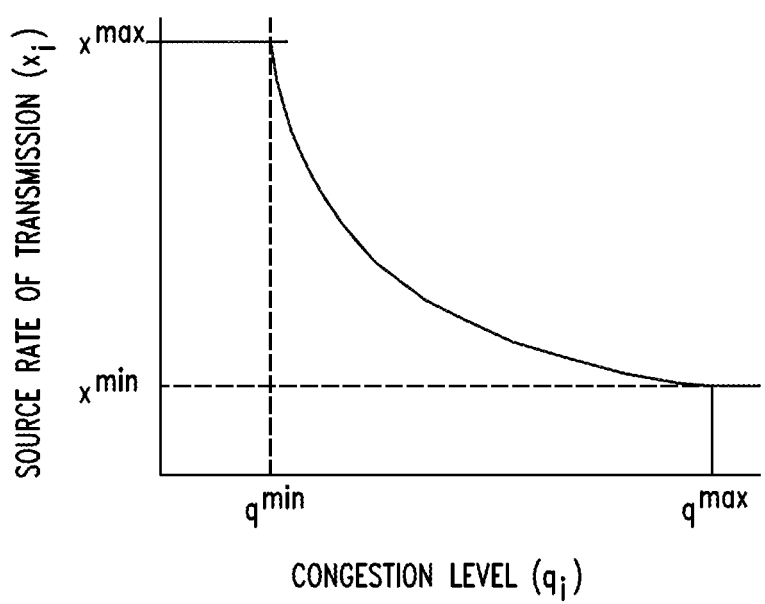
FIG. 3 schematically illustrates the relation between the rate $x_i$ of data packet transmissions from a source node i to a destination node in a data network and the end-to-end dropping probability for said transmissions, e.g., according to a TCP protocol for source nodes of FIG. 1.

FIG. 3 schematically illustrates an example relation between the transmission rate $x_i$ of data packets by a source node i and the corresponding end-to-end data packet dropping rate $q_i$, i.e., the corresponding congestion level. The source node i often will have a maximum possible transmission rate $x_i^{max}$ and a minimum possible transmission rate $x_i^{min}$. For example, the minimum possible transmission rate $x_i^{min}$ for the source node i may be zero, e.g., as is common in the adaptive RED protocol. Over the range of end-to-end data packet dropping rates $[q_i^{min}, q_i^{max}]$, a source node i will often be configured to dynamically vary the transmission rate $x_i$ from $x_i^{max}$ to $x_i^{min}$ in a strictly decreasing manner. For example, such local and dynamic control of the data packet transmission rates is, e.g., expected in source nodes operated according to TCP protocols such as the TCP Reno protocol or the TCP Vegas protocol.

Various embodiments of the data network 10 for which the source nodes 1-N and some or all of the internal nodes j, r, s, . . . operate as already described, the data network 10 may evolve to a quasi-stable operating state for the links L. At a quasi-stable operating state, the available link bandwidths of the links L will vary little in response to small and slowly temporally varying changes in traffic from the source nodes 1-N. An evolution of the data network 10 to such a quasi-stable operating state may occur, e.g., when the traffic pattern of the data network 10 varies slowly. The data network 10 may significantly and/or rapidly evolve away from a quasi-stable operating state or to a different quasi-stable operating state when the traffic pattern in the data network 10 changes substantially and/or rapidly, e.g., during a diurnal variation of use of the data network 10.

Some of the above-described embodiments may evolve the data network 10 to special quasi-stable link-operating state(s) when one, a plurality of, or all of the links L are operated according to specific methods based on local monitoring and control, i.e., distributed control. In some of the specific methods, individual internal node(s) may operate and control local link(s), e.g., link(s) directly end-connected thereto, in a manner that tends to reduce or eliminate excess available bandwidth on the local link(s). In such methods, the local monitoring and control is typically based on the usage of storage in corresponding link-input buffers. That is, the local control is based on the usage of a link-input buffer in an internal node, and the internal node will reduce the available bandwidth of the corresponding link controlled thereby. Such a reduction of available bandwidth may involve powering down physical links in a link bundle that forms the corresponding link and/or may involve powering down other hardware to dynamically adjust the available bandwidth on the link. For these reasons, the reduction of such available link bandwidth may reduce energy consumption by the internal node locally and even reduce energy consumption by the data network 10 globally via the combined separate action of the internal nodes of the entire data network 10.

Below, specific embodiments describe distributed methods operating internal node(s) of the data network 10 of FIG. 1. As already discussed, such methods can reduce energy consumption by powering down links and/or portions thereof to eliminate excess available link bandwidth. Some such methods may be used in manners consistent with the TCP protocol so that the reduction(s) of available link bandwidth interfere less with traffic handling in the data network 10. The illustrated methods may use a drop-based flow control method to manage data packets in link-input buffer(s), i.e., a RED protocol. But, based on the teachings of the present disclosure, a person of ordinary skill in the relevant arts could easily modify the illustrated methods and apparatus to produce methods and apparatus that exploit other flow control methods for links of the data network 10, e.g., methods that use feedback from queuing delays to control the flow of data packets in link(s).

FIG. 4 illustrates a specific method 10 for controlling a link that is directly end-connected to first internal or routing node to a second node of a data network, e.g., the link 1 between internal or routing nodes j and r of FIG. 1. The second node may be an internal or routing node or an edge node of the data network. The first internal or routing node is able to route data packets received at ports thereon from source nodes of the data network to the second node via the link. The first internal or routing node includes a link-input buffer of the link, e.g., the link-input buffer B of the link 1 in FIG. 1, so that the first internal or routing node can control said link.

The method 20 includes reducing an available bandwidth of the link in response a measurement local to the first internal or routing node indicating that the link-input buffer corresponding to the link has a fill level, e.g., is presently filled by data packets, below a positive threshold value, e.g., a preselected value (step 22). The step 22 of reducing may include powering off some hardware for transmitting data from the link-input buffer of the first internal or routing node to the corresponding link. For example, the step 22 of reducing may include powering off one or more physical links of a link bundle that forms the link between the first and second nodes to lower the available bandwidth therein. Alternately, the link may have an available bandwidth that is adjustable via voltage and/or frequency scaling, and the step 22 of reducing may include lowering the available bandwidth of the corresponding link by adjusting said voltage(s) or frequency range[s].

Optionally, the method 20 may include dropping one or more data packets from the link-input buffer of the first internal or routing node in response to a measurement local to the first internal or routing node being indicative of the link-input buffer being filled by data packets to more than a second positive threshold value, e.g., another preselected value (step 24). The step 24 of dropping may be a process in which a probability of dropping a data packet is nonzero when the fill level of the link-input buffer is greater than or equal to the second threshold value, e.g., according to a RED protocol. The second positive threshold value may be larger than or equal to the first positive threshold value. Above the second threshold value, the probability of dropping data packets may increase with the fill level of the corresponding link-input buffer.

Examples of Adjusting the Available Bandwidth of a Link

The method 20 may perform one of below-described methods to locally and dynamically adjust the available bandwidth of a link l at the internal or routing node j, which controls the link l in the data network 10. Of course, other internal or routing nodes r, s, . . . of the data network 10 may also perform the method 20 to control links L locally controlled thereby, and the same internal or routing node j may perform the method 20 to control other link(s) L locally controlled by the same internal or routing node j. In each such case, the various parameters defining the method 20 and the links state are locally defined and may be different in the different internal and routing nodes j, r, s, . . . and/or for the different links L controlled by the same internal or routing nodes j, r, s.

In a first method, the internal node dynamically adjusts the available bandwidth $c_l(t)$ of the link l and the probability $p_l(t)$ to perform an early drop of a data packet from the corresponding link-input buffer B based on the fill level $b_l(t)$ of the corresponding link-input buffer B.

In the first method, the internal node j determines whether to perform an early drop of a data packet from the link-input buffer B via a two-step process. First, the internal node j may determine the probability $p_l(t)$ to make such a drop based on the fill level $b_l(t)$ and the RED protocol as in FIG. 2 (step a). For example, the internal node may consult a local look-up table, which implements the RED protocol as illustrated in FIG. 2, to determine the probability $p_l(t)$ from the measured fill level $b_l(t)$ of the link-input buffer B at the time t. Then, the internal node may decide whether to make a drop of a data packet from the link-input buffer B via a pseudo-random process, for which the drop probability is the probability $p_l(t)$ found in the step of determining. The internal or routing node may randomly, pseudo-randomly, or deterministically identify the data packet to be dropped for the link-input buffer B in response to a decision to make such a drop from the link-input buffer B for the link l.

In the first method, the internal or routing node updates the available bandwidth $c_l(t)$ of the link l by a process that effectively numerically integrates an evolution equation of the approximate form:

$$\frac{d}{dt}c_l(t) = \begin{cases} 0 & \text{if } c_l = c_l^{min} \text{ and } b_l < \tilde{b}_l, \text{ or } c_l = c_l^{max} \text{ and } b_l > \tilde{b}_l, \\ \alpha_l(b_l - \tilde{b}_l(c_l(t))) & \text{otherwise} \end{cases}$$

In the above equation, $\tilde{b}_l(c_l(t))$ is a target value for the used storage in the link-input buffer B, and $\alpha_l$ is a positive parameter that determines the speed of the dynamical adjustment of the available bandwidth of the link l. If $b_l > \tilde{b}_l(c_l)$, the internal or routing node typically updates the link bandwidth $c_l(t)$ to a larger value so that the fill level $b_l(t)$ of the corresponding link-input buffer B will decrease. If $b_l < \tilde{b}_l(c_l)$, the internal or routing node typically updates the link bandwidth $c_l(t)$ to a smaller value so that excess available bandwidth on the link l is reduced. Thus, $\tilde{b}_l(c_l(t))$ and/or $\tilde{b}_l(c_l^*)$, where $c_l^*$ is a quasi-stable point for the above evolution equation, may be an example of the threshold recited in step 22 of the method 20 in some embodiments.

In the above-described method, the target value $\tilde{b}_l(c_l(t))$ of the fill level of the link-input buffer B may be selected to satisfy $\tilde{b}_l(c_l(t))=d_l c_l(t)$, and the parameter $d_l$ may or may not be selected to approximate a target queuing delay for the link-input buffer. The parameter $d_l$ is preferably selected to be less than $\underline{b}_l/c_l^{max}$ so that $\tilde{b}_l(c_l)<\underline{b}_l$ when $c_l<c_l^{max}$. For such a selection, the data network evolves the link l to a quasi-stable operating state, for which $c_l^* < c_l^{max}$, and $p_l$ vanishes at the quasi-stable operating state so that the internal or routing node j should not cause drops of data packets at the link l if the data network operates by TCP and RED protocols.

Various embodiments may use different discrete-time implementations to approximately impose the above-described equation on the temporal evolution of $c_l(t)$. Below, an example of such a discrete-time implementation is described.

In this discrete-time implementation, each dynamical update time is performed at a time t that is an integer multiple of a fundamental update interval T, i.e., update times t are kT where k is an integer. The fundamental update interval T is preferably not smaller than a minimum switching time for the internal node j of the data network 10 and is preferably much larger than said minimum switching time to reduce overhead associated with dynamical bandwidth adjustment of the corresponding link l. Since current data networks typically have minimum switching times of the order of about 1 milli-second (ms), T would typically be much larger than 1 ms, but would not be so large as to not rapidly track typical temporal changes in traffic patterns in the data network. For example, T may be of the order of 100 ms or longer for many current data networks.

In this discrete-time implementation, the value of a function F(kT) at time kT, will be indicated by F[k] where k is the integer indexing the value of the discrete time, i.e., referred to as the discrete time below.

In this discrete-time implementation, the local parameters that are updated by the internal or routing node l at times kT may include parameter $b_l(t)$, which is measured at the link-input buffer B of the link l; $p_l(t)$, which is determined from a measured value of $b_l(t)$ via the RED protocol; and the available bandwidth $c_l(t)$ of the link l and the target use $\tilde{b}_l(c_l(t))$ of the link-input buffer B, which are evaluated via discrete-time evolution equations. For $c_l(t)$, a potential discrete time-evolution equation is:

$$c_l[k+1]=c_l[k]+T\alpha_l(b_l[k]-\tilde{b}_l(c_l[k])) \text{ for } k\in Z.$$

But, the above discrete-time evolution equation does not account for the fact that the link l has a maximum available bandwidth $c_l^{max}$ and a minimum available bandwidth $c_l^{min}$. To account for such limitations on the link's available bandwidth, the above discrete time evolution equation may be replaced by:

$$c_l[k+1]=\left[c_l[k]+T\alpha_l(b_l[k]-\tilde{b}_l(c_l[k]))\right]_{c_l^{min}}^{c_l^{max}} \text{ for } k\in Z.$$

In this discrete-time evolution equation, the object $[\ldots]_{c_l^{min}}^{c_l^{max}}$ is defined as follows:

$$[a]_{c_l^{min}}^{c_l^{max}} = \begin{cases} c_l^{min} & \text{if } a < c_l^{min}, \\ a & \text{if } c_l^{min} < a < c_l^{max}, \\ c_l^{max} & \text{if } a > c_l^{max}. \end{cases}$$

In this discrete-time implementation, the internal node(s) may implement further refinements in the dynamic adjustment of the available bandwidth at link(s).

In one further refinement, the internal node(s) may introduce multiple evolution speeds by updating $c_l[k+1]$ based on an $\alpha_l$ whose value depends on the degree of convergence of the fill level $b_l[k]$ of the link-input buffer for the link l to the target value $\tilde{b}_l(c_l[k])$. In such embodiments, the internal node may update $c_l[k]$ by setting:

$$\alpha_l=\alpha_{l,1} \text{ for } |b_l[k]/\tilde{b}_l(c_l[k])-1|\leq\epsilon_l \text{ and } \alpha_l=\alpha_{l,2} \text{ for } |b_l[k]/\tilde{b}_l(c_l[k])-1|>\epsilon_l.$$

Here, $\alpha_{l,2}>\alpha_{l,1}$ and $\epsilon_l$ is typically a small number. For example, these parameters, which fix the dynamical evolution speeds may be selected to be: $\epsilon_l=0.1$, $\alpha_{l,2}=0.2$, and $\alpha_{l,1}=0.04$, but many other values would typically be advantageously useable.

Another further refinement, the internal or routing node(s), e.g., the nodes j, r, and s of FIG. 1, may use a different dynamical process to account for the discrete nature of the available bandwidth on the link l. That is, dynamical bandwidth adjustment is typically subject to a restriction of selecting available bandwidth(s) of link(s) from discrete values in preselected and finite set(s). The dynamical evolution of the available bandwidth(s) of link(s) may implement such a restriction in different manners.

In a first implementation, the controlling internal or routing node j may set the available bandwidth of the controlled link l, at the discrete time (k+1), to be the discrete value that is closest to the value of $c_l[k+1]$ found via the above-described dynamical update algorithm.

In a second implementation, the controlling internal or routing node j may set the available bandwidth of the controlled link l, at the discrete time (k+1), to the discrete value that is larger than and then, closest to the value of $c_l[k+1]$, as found via the above-described dynamical update algorithm. Such a process may be less likely to set the available bandwidth at the controlled link to a value lower than the current traffic at the link, which may cause less congestion.

In a third implementation, the controlling internal or routing node j may set the available bandwidth of the controlled link l, at the discrete time (k+1), in a manner that selectively adds hysteresis. The hysteresis may be selected to reduce oscillatory behavior when the fill level $b_l[k]$ of the link-input buffer B is close to the target fill level $\tilde{b}_l(c_l[k])$ at the discrete time k. For example, the hysteresis may be biased so that the available bandwidth of the link l tends to remain at a larger value, e.g., to lower a probability of occurrences of periods in which the available bandwidth is lower than the traffic $y_l[k]$ at the link l, e.g., to lower negative effects on congestion.

Figure 5:
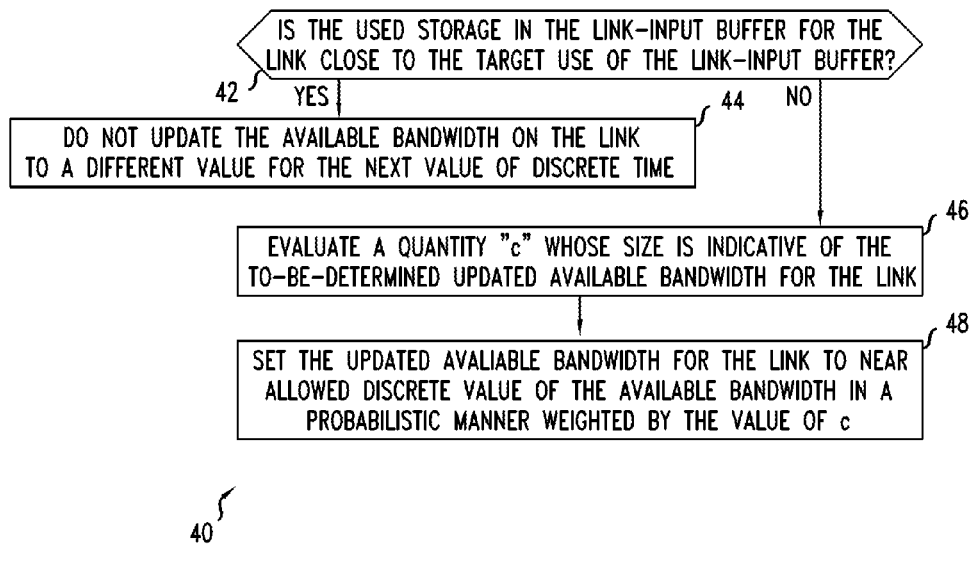
FIG. 5 is a flow chart illustrating an example method for updating available bandwidth of a link, e.g., a link of FIG. 1, in a local and distributed manner, e.g., according to the method of FIG. 4.

In this third implementation, the controlling internal or routing node j updates the available bandwidth $c_l[k]$ of the link l, according to a method 40 as illustrated in FIG. 5. The method 40 exploits hysteresis when the used storage $b_l[k]$ on the link input buffer, at the discrete time k, is close to the target use $\tilde{b}_l(c_l[k])$. The method 40 also accounts for the discrete nature of the allowed values of the available bandwidth $c_1[k]$ on the link l.

Prior to an update of the available bandwidth, at discrete time (k+1), the method 40 includes determining whether the used storage $b_l[k]$ in the link-input buffer for the link l is close to the target use $\tilde{b}_l(c_l[k])$ of the link input buffer (step 42). For example, the step 420 of determining may include evaluating whether the used storage $b_l[k]$ for the link l satisfies: $b_l[k]\in[b_l'[k],\tilde{b}_l(c_l[k])]$. Here, $b_l'[k]$ defines a range that quantifies the concept of being close to the target use $\tilde{b}_l(c_l[k])$. As an example, the parameter $b'_l[k]$ may be preselected to $\tilde{b}_l(c_l[k])/2$, but the range may also be differently defined in different specific embodiments.

If the used storage $b_l[k]$ of the link input buffer B is close to the target use $\tilde{b}_l(c_l[k])$ at the discrete time k, the method 40 includes not updating the available bandwidth on the link l for the next value of the discrete time, i.e., (k+1) (step 44). That is, the method 40 includes defining the updated value of the available bandwidth as follows: $c_l[k+1]=c_l[k]$. Thus, the available bandwidth on the link l does not change, at the discrete time (k+1), and hysteresis fixes the available bandwidth.

If the used storage $b_l[k]$ is not close to the target use $\tilde{b}_l(c_l[k])$, i.e., at the discrete time k, the method 40 includes updating the available bandwidth $c_l[k]$ on the link l through multiple substeps.

In the first substep, the method 40 includes evaluating a quantity "c" whose size is indicative of the to-be-determined updated value $c_l[k+1]$ for the available bandwidth on the link l (step 46). The quantity c may, e.g., be defined by the following equation:

$$c \equiv [c_l[k] + T\alpha_l(b_l[k] - \tilde{b}_l(c_l[k]))]_{c_l^{min}}^{c_l^{max}}.$$

In the above discrete-time evolution equation, the object $[\ldots]_{c_l^{min}}^{c_l^{max}}$ is defined as follows:

$$[a]_{c_l^{min}}^{c_l^{max}} = \begin{cases} c_l^{min} & \text{if } a < c_l^{min}, \\ a & \text{if } c_l^{min} < a < c_l^{max}, \\ c_l^{max} & \text{if } a > c_l^{max}. \end{cases}$$

The above definition of the quantity "c" takes into account the fact that the available max bandwidth on the link l has upper and lower bounds, i.e., $c_l^{max}$ and $c_l^{min}$ whose values may vary from link-to-link.

In the second substep, the method 40 includes selects one of the allowed values of the available bandwidth for the link l, i.e., $c_l^q$ or $c_l^{q+1}$, in a probabilistic manner, which is weighted based on the value of "c" as evaluated at the step 46 (step 48).

The allowed values $c_l^q$ and $c_l^{q+1}$ of the available bandwidth on the link l are the nearest neighbors to the value of c, which was evaluated at the step 46 (step 48). In particular, the nearest neighboring values $c_l^q$ and $c_l^{q+1}$ are defined such that $c_l^{q+1} \geq c \geq c_l^q$. Here, the discrete set of allowed values of the available bandwidth on the link l form an ordered sequence 0, $c_l^1, c_l^2, \ldots$, 1 of possible values. In this sequence, $c_l^n > c_l^m$ if n>m. Thus, the neighboring values $c_l^q$ and $c_l^{q+1}$ include the smallest allowed value that is greater than or equal to the value of c and the greatest allowed value that is smaller than or equal to value of c.

The method 40 typically includes selecting the updated value of the available bandwidth on the link l at the discrete time (k+1), i.e., $c_l[k+1]$, pseudo-randomly or randomly from the two allowed neighboring values $c_l^q$ and $c_l^{q+1}$. For example, the act of selecting may involve fixing $c_l[k+1]$ according to the rule:

$$c_l[k+1] = \begin{cases} c_l^q & \text{with probability } p, \\ c_l^{q+1} & \text{with probability } (1-p). \end{cases}$$

In the above rule, p may be approximately defined by: $c=pc_l^q + (1-p)c_l^{q+1}$ so that the probabilistic selection of the updated available bandwidth $c_l[k+1]$ is based on the value of c as evaluated at the step 46.

Due to a selective and biased use of hysteresis, the method 40 may favor higher values for the available bandwidth on the link l, e.g., when the updates to the available bandwidth converge towards a quasi-stable operating value from higher values of the available bandwidth. For that reason, implementing the above set of substeps may produce a sequence of values of the available bandwidths on the link l for which the probability of congestion at the link l is lower.

Figure 6:
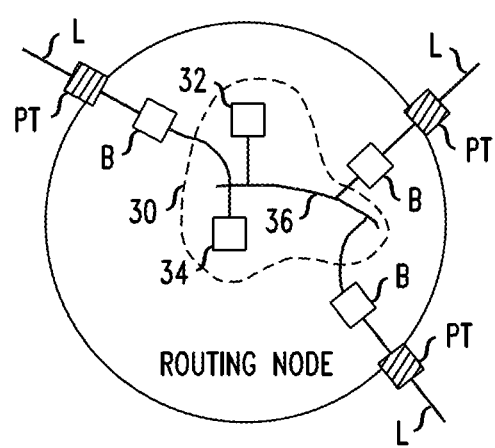
FIG. 6 is a block diagram illustrating an apparatus that may implement any of the methods described in this application, e.g., in a local distributed manner on one or more internal or routing nodes of FIG. 1.

FIG. 6 illustrates apparatus 30 that various embodiments of individual internal or routing nodes, e.g., the nodes j, r, and/or s of FIG. 1, may have to use to implement the above method(s) in a distributed manner. The apparatus 30 includes a digital processor 32, a digital data storage device 34, and a data bus and/or interface 36. The digital processor 32 is programmable to perform the steps of one or more of the above-described methods, e.g., the methods 20, 40 of FIGS. 4 and 5. The digital data storage device 34 stores one or more machine-executable program(s) in a non-transient manner. For such program storage, the digital data storage device 34 may include, e.g., an electronic memory, optical or magnetic disk(s) and drive(s), a hard drive, a flash drive or a combination of one or more such devices for storing said digital program(s). The data bus and/or interface 36 provides a data link between the digital processor 32 and the digital data storage device 34 thereby supporting the execution of said stored and executable program(s) via the digital processor 32. The same or a different data bus and/or interface 36 provides control and/or monitoring connections between the apparatus 30 and one or more link input buffer(s) (B) of the same internal or routing node, which are operated according to one or more of the above described methods. Thus, the apparatus 30 may control one, multiple or all link input buffers (B) of link(s) directly end-connected to the same internal or routing node.

The inventions are intended to include other embodiments that would be obvious to one of skill in the art in light of the description, figures, and claims.

What we claim is:

1. An apparatus comprising:
   a first node configured to receive a plurality of data packets from a plurality of source nodes of a data network and to selectively route a first portion of the received data packets to a link via a port of the first node; and
   a link-input buffer being located in the first node and being configured to store the first portion of the received data packets for transmission to the link via the port; and
   wherein the first node is configured to power off hardware for transmitting received data packets to the link in response to a fill level of the link-input buffer being below a threshold;
   wherein the first node is configured to selectively transmit a second portion of the data packets received therein to a second link connected to another port of the first node;
   wherein a second link-input buffer is located in the first node and being configured to store the second portion of the data packets received by the first node for transmission to the second link; and
   wherein the first node is configured to power off hardware for transmitting data packets to the second link in response to a fill level of the second link-input buffer being below a third threshold.

2. The apparatus of claim 1, wherein the first node is configured to drop one or more data packets from the link-input buffer in response to a fill level of the link-input buffer being above a second threshold, the second threshold being less than an available bandwidth of the link.

3. The apparatus of claim 2, wherein the first node is configured to drop one or more data packets from the link-input buffer with a probability that is monotonic non-decreasing with the fill level of the link-input buffer.

4. The apparatus of claim 1, wherein the first node is configured to support transport layer operations according to Transmission Control Protocol and to operate the link-input buffer according to a RED protocol.

5. The apparatus of claim 1, wherein the first node is configured to support transport layer operations according to Transmission Control Protocol and is configured to flow control the link based on queuing delay feedback.

6. The apparatus of claim 1, further comprising the link, the link being a bundle of parallel physical links, each physical link having an input end-connected to a port of the first node.

7. The apparatus of claim 6, further comprising a second node having a port connected to the link and being configured to selectively route data packets received from the link to a plurality of destination nodes of the data network and to selectively route some of the data packets received from the link to another link connected to a port of the second node; and
- a third link-input buffer being located in the second node and being configured to store some data packets received by the second node for transmission to the second link; and
- wherein the second node is configured to power off hardware for transmitting data packets to the second link in response to a fill level of the third link-input buffer being below a threshold.

8. A method, comprising:
receiving a plurality of data packets, by a first node, from a plurality of source nodes of a data network;
selectively routing a first portion of the received data packets to a link via a port of the first node;
storing the first portion of the received data packets in a link-input buffer being located in the first node;
powering off hardware for transmitting received data packets to the link in response to a fill level of the link-input buffer being below a threshold;
selectively transmitting a second portion of the data packets received to a second link connected to another port of the first node;
storing the second portion of the received data packets in a second link-input buffer being located in the first node; and
powering off second hardware for transmitting received data packets to the second link in response to a fill level of the second link-input buffer being below a threshold.

9. The method of claim 8, wherein the hardware includes hardware for transmitting data from a routing node of the data network to the link, the routing node including the link-input buffer therein.

10. The method of claim 8, wherein the hardware includes one or more physical links of a link bundle forming the link of a data network.

11. The method of claim 8, further comprising:
dropping one or more data packets from the link-input buffer in response to determining that the link-input buffer is filled to more than a second threshold, the second threshold being less than an available bandwidth of the link.

12. The method of claim 9, further comprising operating a portion of the data network including the routing node according to a TCP protocol and an RED protocol.

* * * * *